United States Patent [19]
Humphrey

[11] Patent Number: 5,104,613
[45] Date of Patent: Apr. 14, 1992

[54] MATERIAL HANDLING SYSTEM
[76] Inventor: Verle Humphrey, 702 NE. Third, Guymon, Okla. 73942
[21] Appl. No.: 556,633
[22] Filed: Jul. 23, 1990
[51] Int. Cl.$^5$ ................................................. B60P 1/04
[52] U.S. Cl. ..................................... 414/526; 414/523; 414/489; 298/7; 198/657; 222/610
[58] Field of Search ............... 414/489, 486, 488, 501, 414/507, 519, 523, 526, 326; 222/412, 413, 328, 610, 526; 198/670, 657; 298/7

[56] References Cited
U.S. PATENT DOCUMENTS

| | | | |
|---|---|---|---|
| 1,190,417 | 7/1916 | Jacobs | 298/7 X |
| 1,758,457 | 5/1930 | Miller | 298/7 X |
| 2,139,417 | 12/1938 | Milan . | |
| 2,319,588 | 5/1943 | Dreese | 414/523 |
| 2,417,020 | 3/1947 | Shugart . | |
| 2,697,609 | 12/1954 | Chase et al. | 298/7 X |
| 3,056,521 | 10/1962 | Marr | 414/526 X |
| 3,090,527 | 5/1963 | Rensch | 298/7 X |
| 3,265,253 | 8/1966 | Niewold | 414/523 X |
| 3,439,819 | 4/1969 | Quanbeck . | |
| 3,717,272 | 2/1973 | Chartier et al. | 414/526 X |
| 4,365,922 | 12/1982 | Borders . | |
| 4,411,581 | 10/1983 | Niewold | 414/489 |
| 4,419,037 | 12/1983 | Niewold | 414/489 |
| 4,613,275 | 9/1986 | Karlowsky . | |

FOREIGN PATENT DOCUMENTS 915027 1/1963 United Kingdom ............... 414/523

Primary Examiner—Frank E. Werner
Attorney, Agent, or Firm—Litman, McMahon & Brown

[57] ABSTRACT

A material handling system includes a hopper assembly for mounting on a vehicle bed. The hopper assembly has a rear leg for mounting on a rear end wall of the vehicle bed and a side leg for mounting on a sidewall of the vehicle bed. The hopper legs intersect at a corner which can be mounted adjacent to a rear corner of a vehicle bed. The hopper assembly includes an interior with a lowest point in the hopper assembly corner. A conveyor assembly includes a proximate end received in the hopper side leg and extending to the hopper corner. The conveyor assembly can be adjustably mounted on the vehicle bed sidewall for discharging material to various locations alongside the vehicle.

7 Claims, 1 Drawing Sheet

U.S. Patent        Apr. 14, 1992        5,104,613
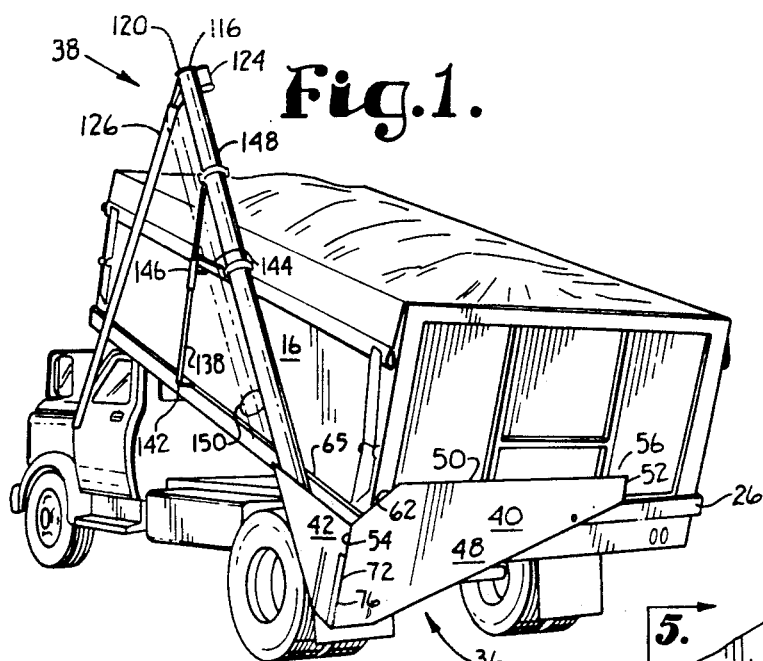
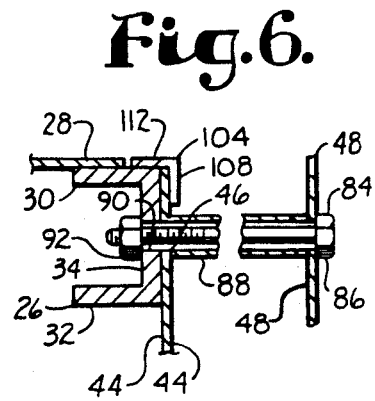
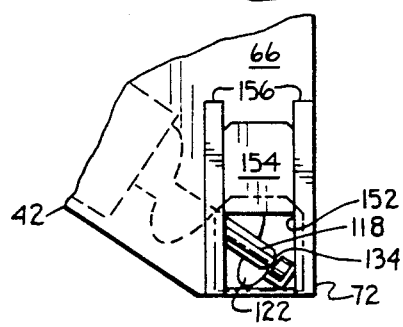
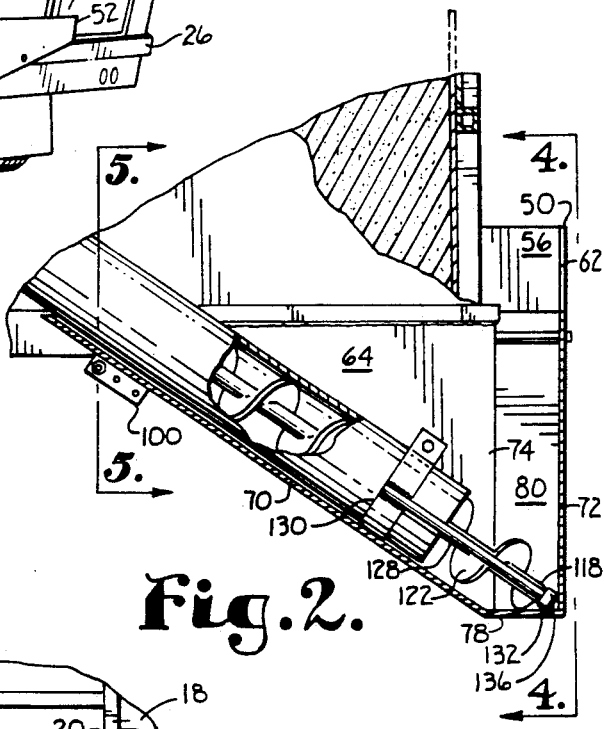
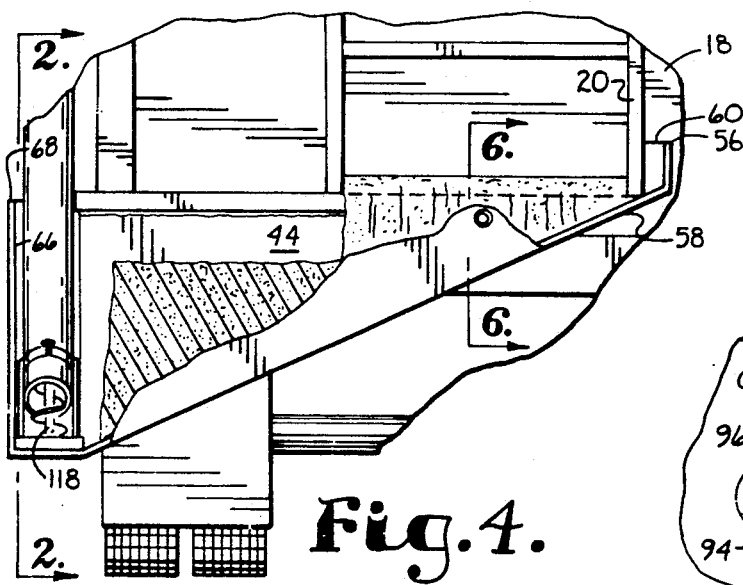
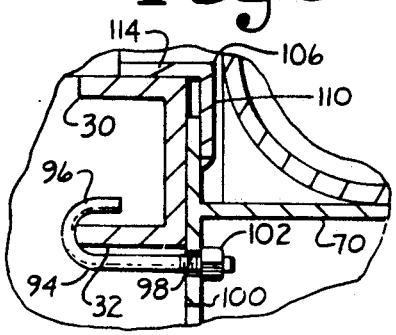

5,104,613

MATERIAL HANDLING SYSTEM

BACKGROUND OF THE INVENTION

The present invention relates generally to bulk material handling, and in particular to a hopper for a bulk material auger mounted on the side of a vehicle dump bed.

DESCRIPTION OF THE RELATED ART

Bulk materials are often transported in vehicles with beds, including trucks and trailers. Dump trucks and dump trailers include beds which are tiltable about transverse pivotal axes whereby their contents can be discharged rearwardly.

Sometimes it is desirable to discharge the vehicle bed contents to an elevated receiving area. For example, it may be desirable to transfer grain from a vehicle bed to a grain storage vessel, such as a silo, or to another vehicle bed. Conveying devices used for transferring bulk material to elevated areas include conveyors and screw-type augers. Augers have heretofore been mounted alongside dump truck beds for transferring bulk material therefrom. For example, the Marr U.S. Pat. No. 3,056,521 discloses an apparatus for unloading and conveying material from a truck bed. However, the Marr apparatus is relatively complicated and includes a pair of auger-type conveyors for conveying material across the back of the dump bed and then upwardly to an elevated discharge location.

The Karlowsky U.S. Pat. No. 4,613,275 discloses another auger arrangement for unloading a truck box, including a hopper mounted on the tailgate for receiving grain discharged through a tailgate aperture. A possible disadvantage with this arrangement is that the auger must be removed from the hopper for placement in its storage/travel position alongside the truck box. Another possible disadvantage with the Karlowsky arrangement is that the material discharge locations are located towards the rear of the truck where the auger is mounted in its use position, and thus might be difficult for the driver to observe from the cab of the truck.

The material handling system of the present invention addresses the aforementioned problems with previous material handling systems of the type adapted for mounting on dump truck beds and including screw augers.

SUMMARY OF THE INVENTION

In the practice of the present invention, a material handling system is provided which includes a hopper assembly for mounting on a vehicle bed and a conveyor assembly, which can comprise an auger. The hopper assembly includes a rear leg for placement against a vehicle bed tailgate or rear end wall and a side leg for placement against a vehicle bed sidewall. The hopper assembly legs have floors which slope downwardly to a low point at a corner intersection of the hopper legs for receiving an intake end of the conveyor. The conveyor assembly can thus be mounted alongside the vehicle bed by a conveyor assembly support. Grain discharge through the vehicle bed tailgate can flow to the hopper assembly corner where it is taken in by the conveyor assembly for conveyance through the auger alongside the vehicle bed for discharge through a discharge conduit.

OBJECTS AND ADVANTAGES OF THE PREFERRED EMBODIMENT

The principal objects and advantages of the present invention include: providing a material handling system; providing such a system which is adapted for mounting on a vehicle with a bed; providing such a system which includes a hopper assembly with side and rear legs for mounting behind and alongside the vehicle bed; providing such a system which delivers material from the vehicle bed to a location adjacent to a corner of the vehicle bed for conveyance away from the vehicle; providing such a system which is useable with augers; providing such a system which can effectively convey substantially the entire contents of a vehicle bed; providing such a system wherein the conveyor assembly is adjustably mounted longside the vehicle bed for discharging material to various locations alongside the vehicle; providing such a material handling system which can easily be mounted on a vehicle; providing such a material handling system which can be mounted on a vehicle with minimal modifications thereto; providing such a material handling system which is economical to manufacture, efficient in operation, capable of a long operating life and particularly well-adapted for the proposed useage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a left rear perspective view of a material handling system, shown mounted on a dump truck.

FIG. 2 is an enlarged, fragmentary, vertical, cross-sectional view of the material handling system taken generally along line 2—2 in FIG. 4 and particularly showing the juncture of a hopper assembly and a conveyor assembly thereof.

FIG. 3 is an enlarged, fragmentary, side elevational view of the hopper assembly.

FIG. 4 is an enlarged, rear elevational view of the hopper assembly taken generally along line 4—4 in FIG. 2, with portions broken away to reveal internal construction.

FIG. 5 is an enlarged, vertical, fragmentary, cross-sectional view of the material handling system taken generally along line 5—5 in FIG. 2.

FIG. 6 is an enlarged, fragmentary, cross-sectional view of the material handling system taken generally along line 6—6 in FIG. 4 and particularly showing a mounting fastener.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of similar import.

Referring to the drawings in more detail, the reference numeral 10 generally designates a material handling system embodying the present invention. Without limitation on the generality of useful applications of the material handling system 10, it is shown mounted on a dump bed 12 of a dump truck 14. The dump bed 12 includes opposite sidewalls 16 and a rear end wall or tailgate 18 with a tailgate opening 20, the size of which can be adjusted by a vertically-slidable gate door 22, which can be used to control the rate of flow of material 24 from the dump bed 12. A roll-over cover or tarp 19 can be provided for covering the open top of the dump bed 12 from one sidewall 16 to the other.

A perimeter channel member 26 extends around the dump bed 12 adjacent to and surrounding a bed floor 28. The channel member 26 includes upper and lower flanges 30, 32 interconnected by a channel web 34.

The material handling system 10 generally includes a hopper assembly 36 and a conveyor or auger assembly 38.

II. Hopper Assembly 36

The hopper assembly 36 is generally L-shaped in plan with a rear leg 40 extending along the tailgate 18 and a side leg 42 extending along the sidewall 16.

The hopper rear leg 40 includes a front or inner panel 44 with an upper edge 46 and a rear or outer panel 48 with an upper edge 50. The front and rear panels 44, 48 extend in a substantially vertical, parallel relationship between a first or inner end 52 of the hopper rear leg 40 and a second or outer end 54 thereof. An inner end wall 56 interconnects the front and rear panels 44, 46. A floor 58 slopes outwardly-and-downwardly from the rear leg inner end 52 to adjacent its outer end 54, and interconnects the front and rear panels 44, 48.

The front panel upper edge 46 is located generally below a level of the rear panel upper edge 50, except for a return section 60 of the front panel 44, which extends to approximately the heights of the rear panel 48 and the inner end wall 56 for mounting against the tailgate 18 adjacent to the tailgate opening 20. The rear panel upper edge 50 slopes downwardly and outwardly adjacent to the outer end 54 of the hopper rear leg 40 at a rear panel mitered edge 62.

The hopper side leg 42 includes a first or inner panel 64 with an upper edge 65 and a second or outer panel 66 with an upper edge 68. A downwardly-and-rearwardly sloping floor 70 interconnects the panels 64, 66. The legs 40, 42 converge at a hopper corner 72 with inside and outside panel corners 74, 76 formed by the seam connections of the inner panels 44, 64 and the outer panels 48, 66 respectively. The hopper corner 72 includes a hopper bottom 78, which is generally the lowest part of the hopper assembly 36. The hopper assembly 36 has the general configuration of a channel or trough with an interior 80 open upwardly at an open top 82 defined by the panel upper edges 46, 50, 65 and 68.

A rear leg fastener 84 (FIG. 6) includes a bolt 86 extending through the front and rear panels 44, 48 and through a pipe spacer 88 extending therebetween. The bolt 86 further extends through an apperture 90 in the channel member web 34 and threadably receives a nut 92 inside the perimeter channel member 26. The nut 92 can be welded in place to facilitate mounting and demounting the hopper assembly 36.

The hopper side leg 42 is mounted by means of a side leg fastener 94 including a J-bolt 96 adapted to hook the channel member lower flange 32 (FIG. 5). The J-bolt 96 extends through an apperture 98 in a mounting bracket 100 extending downwardly from the floor 70 and threadably receives a nut 102.

Rear and side angle section members 104, 106 have vertical flanges 108, 110 mounted on the inner panel upper edges 46, 65 and horizontal flanges 112, 114 extending inwardly for placement on top of the channel member upper flange 30 (FIGS. 5 and 6).

The outer panel 66 of the hopper side leg 42 can include an inspection port or opening 152 adapted for selective closure by a hopper gate panel 154 vertically slidably received in a pair of gate panel guide members 156 positioned on either side of the port or opening 152. The opening 152 provides selective access to a lower portion of the hopper interior 80 adjacent to the corner 72 and the auger proximate end 134 and the thrust bearing 136 located thereat. The opening 152 also provides access to an area of the hopper interior 80 which is located generally at its lowest level.

III. Conveyor Assembly 38

The conveyor assembly 38 includes a screw auger subassembly 116 with proximate and distal ends 118, 120 and a screw auger 122 driven by a motor 124 mounted at the distal end 120.

A discharge conduit 126 communicates with the screw auger subassembly distal end 120 and can be swingably connected thereto for swinging outwardly from the truck 114 to a desired material discharge location. The screw auger subassembly 116 described thus far is of a type which is commercially available, and various conveyor means, including screw augers and belt conveyors, could be adapted to work with the hopper assembly 36 of the present invention.

A pair of thrust rods 128 are mounted on opposite sides of the screw auger subassembly proximate end 118 by an annular clamp 130 and extend rearwardly and downwardly to a thrust angle section member 132 mounted in the bottom of the hopper interior 80 at the hopper corner 72 (FIG. 2). The screw auger 122 includes a proximate end 134 rotatably journaled in a thrust bearing 136 mounted on the thrust angle section member 132.

A screw auger subassembly support 138 includes a vertical standard 140 connected to the truck sidewall 16 by a suitable bracket 142 and a strut 144 extending rearwardly from the vertical standard 140. A pipe sleeve 146 receives the vertical standard 140 and is attached to the truck sidewall 16. The screw auger subassembly support 138 can be telescopically adjustable to raise and lower the screw auger subassembly 116. The vertical standard 140 and the strut 144 can be attached to the screw auger subassembly 116 by suitable annular clamps 148. A loop 150 extends from the screw auger subassembly 116 for receiving the free end of the discharge conduit 126 so that it can be positioned alongside the truck sidewall 16 as shown in phantom lines in FIG. 1.

IV. Operation

In operation, the hopper assembly 36 can easily be installed on the truck dump bed 12 with a minimum of modification thereto. For example, if the conveyor assembly 38 is already in place on the truck 14, the only modification required for mounting the hopper assembly 36 is drilling the apperture 90 through the channel member web 34 for receiving the bolt 86. The J-bolt 96 can be hooked to an existing channel member lower flange 32. With the discharge conduit 126 folded alongside the dump bed 12, the material handling system 10 does not project very far in any direction from the dump bed 12 and thus does not interfere with the normal operation of the truck 14. Also, the material handling system 10 does not interfere with the operation of the cover or tarp 19.

The tailgate door 22 can be adjusted to control the flow of material 24 therethrough from the dump bed 12. Material from the dump bed 12 flows into the hopper interior 80 adjacent to the rear leg inner end 52 and flows down the rear leg floor 58 to the hopper corner 72. The material in the hopper corner 72 can be gathered by the auger proximate end 118 for conveyance through the screw auger subassembly 116 and dispensing to a desired location from its discharge conduit 126. When the material handling system 10 is used for handling grain, the grain material 24 can be discharged to various receiving structures, such as another truck, a grain elevator, etc. However, operation of the material handling system 10 is not limited to grain, and various other flowable materials could be utilized therewith.

Tilting the dump bed 12 can increase the flow of material 24 to the gate door 22, and can also effectively empty the dump bed 12. The termination of the screw auger 122 at the lowest part of the hopper interior 80 facilitates removal of substantially all of the material 24 from the hopper assembly 36. Remaining amounts of material can be removed through the access port or opening 152.

The operation of the screw auger subassembly 116 cooperates with the configuration of the hopper assembly 36 to facilitate the flow of material 24 since vibrations from the operation of the screw auger subassembly 116 could vibrate the hopper assembly 36 to facilitate material flow.

It is to be understood that while certain forms of the present invention have been illustrated and described herein, it is not to be limited to the specific forms or arrangement of parts described and shown.

What is claimed and desired to be secured by Letters Patent is as follows:

1. In combination with a vehicle including a dump bed, said dump bed having a sidewall and a tailgate with a discharge opening, the improvement of a material handling system, which includes:
   (a) a hopper assembly including:
      (1) a material-receiving rear leg with inner and outer panels positioned in parallel, spaced relation, inner and outer ends and a floor sloping downwardly from said inner end to said outer end;
      (2) a material delivery side leg with inner and outer panels positioned in parallel, spaced relation, front and back ends and a floor sloping downwardly from said front end to said back end;
      (3) said legs intersecting at a corner intersection and said hopper assembly leg floors intersecting in a common plane;
      (4) a hopper interior including a lowest point at said corner intersection;
      (5) rear leg mounting means for mounting said rear leg on said bed adjacent to said tailgate thereof in material-receiving relation with respect to said tailgate opening; and
      (6) side leg mounting means for mounting said side leg on said bed adjacent said sidewall thereof; and
   (b) a material conveyor assembly including:
      (1) a screw auger subassembly including a proximate end received in said hopper assembly adjacent said corner intersection thereof and a distal end;
      (2) a discharge conduit end communicating with said screw auger subassembly distal end; and
      (3) adjustable mounting means for adjustably mounting said screw auger subassembly on said dump bed sidewall.

2. The invention of claim 1, which includes:
   (a) a thrust bearing mounted in said hopper assembly at said corner intersection thereof; and
   (b) said screw auger subassembly including a screw auger with a proximate end journaled in said thrust bearing.

3. The invention of claim 1, which includes:
   (a) an opening in one of said hopper leg outer panels adjacent to said hopper corner intersection; and
   (b) a panel slidably mounted on the respective hopper leg outer panel for selectively closing said opening whereby said slidably mounted panel when open provides access to said hopper corner intersection.

4. A bulk material hopper for a structure including a floor, a sidewall and a rear wall, said structure having an opening in one of said walls leading to the hopper, which comprises:
   (a) a hopper assembly including:
      (1) a material-receiving rear leg with inner and outer panels positioned in parallel, spaced relation, inner and outer ends and a floor sloping downwardly from said inner end to said outer end;
      (2) a material delivery side leg with inner and outer panels positioned in parallel, spaced relation, front and back ends and a floor sloping downwardly from said front end to said back end;
      (3) said legs intersecting at a corner intersection and said hopper assembly leg floors intersecting in a common plane;
      (4) a hopper interior including a lowest point at said corner intersection;
      (5) rear leg mounting means for mounting said rear leg on said structure adjacent said rear wall thereof in material-receiving relation with respect to said wall opening; and
      (6) side leg mounting means for mounting said side leg on said structure adjacent said sidewall thereof; and
   (b) a material conveyor assembly including:
      (1) a screw auger subassembly including a proximate end received in said hopper assembly adjacent said corner intersection thereof and a distal end;
(2) a discharge conduit end communicating with said screw auger subassembly distal end; and
(3) adjustable mounting means for adjustable mounting said screw auger subassembly on said structure sidewall.

5. The invention of claim 4, which includes:
(a) a hopper rear leg mounting fastener extending through said rear leg panels; and
(b) a hopper side leg fastener extending through said hopper side leg panels.

6. The invention of claim 5 wherein said hopper side leg fastener comprises a J-bolt.

7. The invention of claim 4, which includes:
(a) a thrust bearing mounted in said hopper assembly at said corner intersection thereof; and
(b) said screw auger proximate end being journaled in said thrust bearing.

* * * * *